(12) United States Patent
Schmitt et al.

(10) Patent No.: US 9,984,245 B2
(45) Date of Patent: May 29, 2018

(54) METHODS, SYSTEMS, AND COMPUTER READABLE MEDIA FOR PROVIDING A SECURE VIRTUAL RESEARCH SPACE

(71) Applicant: The University of North Carolina at Chapel Hill, Chapel Hill, NC (US)

(72) Inventors: Charles Patrick Schmitt, Chapel Hill, NC (US); Jeffrey Scott Chase, Durham, NC (US); Ilya Baldin, Raleigh, NC (US); Jason Matthew Coposky, Apex, NC (US); Michael Rolandus Shoffner, Durham, NC (US); Brent Watson Lamm, Raleigh, NC (US); Javed Mostafa, Cary, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 208 days.

(21) Appl. No.: 14/417,126

(22) PCT Filed: Jul. 25, 2013

(86) PCT No.: PCT/US2013/052005
§ 371 (c)(1),
(2) Date: Jan. 23, 2015

(87) PCT Pub. No.: WO2014/018731
PCT Pub. Date: Jan. 30, 2014

(65) Prior Publication Data
US 2015/0235045 A1  Aug. 20, 2015

Related U.S. Application Data

(60) Provisional application No. 61/675,780, filed on Jul. 25, 2012.

(51) Int. Cl.
G06F 17/30 (2006.01)
G06F 21/62 (2013.01)
(Continued)

(52) U.S. Cl.
CPC .... G06F 21/6218 (2013.01); G06F 17/30082 (2013.01); G06F 17/30289 (2013.01);
(Continued)

(58) Field of Classification Search
CPC .................................................. G06F 21/6218
See application file for complete search history.

(56) References Cited

U.S. PATENT DOCUMENTS 5,631,127 A  5/1997 Sundrehagen
5,827,645 A  10/1998 Sundrehagen
(Continued)

FOREIGN PATENT DOCUMENTS

WO  WO 2008/043182 A1  4/2008
WO  WO 2012/092025 A2  7/2012

OTHER PUBLICATIONS

Article entitled "Secure Medical Research Workspace", by Owen et al., dated Feb. 10, 2011.*
(Continued)

Primary Examiner — Mahesh H Dwivedi
(74) Attorney, Agent, or Firm — Jenkins, Wilson, Taylor & Hunt, P.A.

(57) ABSTRACT

Methods, systems, and computer readable media for providing a secure virtual research space are disclosed. According to one aspect, a system for providing a secure virtual research space includes: a data grid for storing and managing data to be shared among multiple collaborative partners, the data grid comprising at least one data storage device; at least one virtual network appliance, each virtual network appliance comprising a hardware processor for providing controlled access to shared data on the data grid by a user; and a data leakage protection mechanism for preventing unauthorized transfer of data out of the secure virtual research space.

31 Claims, 6 Drawing Sheets

(51) Int. Cl.
*H04L 29/06* (2006.01)
*H04L 29/08* (2006.01)

(52) U.S. Cl.
CPC .............. *H04L 63/10* (2013.01); *H04L 67/10* (2013.01); *H04L 67/306* (2013.01)

(56) References Cited

U.S. PATENT DOCUMENTS

| | | | |
|---|---|---|---|
| 5,958,717 | A | 9/1999 | Sundrehagen |
| 6,063,581 | A | 5/2000 | Sundrehagen |
| 2009/0030957 | A1* | 1/2009 | Manjunath ........ G06F 17/30233 |
| 2009/0164267 | A1* | 6/2009 | Banatwala ........ G06F 17/30997 707/736 |
| 2010/0107220 | A1 | 4/2010 | Nguyen |
| 2012/0131635 | A1 | 5/2012 | Huapaya |
| 2012/0240220 | A1* | 9/2012 | Smith ..................... G06F 21/34 726/17 |
| 2013/0254397 | A1* | 9/2013 | Lai .......................... H04L 51/32 709/225 |
| 2016/0112398 | A1* | 4/2016 | Banatwala ........... G06Q 10/101 726/5 |

OTHER PUBLICATIONS

Article entitled "Data Management Practices for Collaborative Research", by Schmitt et al., dated Jul. 22, 2011.*
Article entitled "No Exit", by RENCI, dated Jun. 3, 2011.*
Article entitled "Layer 2 and 3 Virtual Private Networks: Taxonomy, Technology, and Standardization Efforts", by Knight et al., Copyright 2004.*
Article entitled "Authorization Control in Collaborative Healthcare Systems", by He et al., dated Jul. 16, 2009.*
Dictionary.com definition of "institution", dated Dec. 5, 2017.*
Notification of Transmittal of the International Search Report and the Written Opinion of the International Searching Authority, or the Declaration for International Application No. PCT/US2013/052005 (dated Nov. 8, 2013).
Veerle Van den Eynden et al., "Managing and Sharing Data, Best Practice for Researchers," http://data-archive.ac.uk/media/2894/managingsharing.pdf, UK Data Archive, (May 2011).
Kate Crawford et al., "The co-evolution of an accessible but secure virtual space for collaborative activities," 19th Bled eConference, (Jun. 2006).

* cited by examiner

METHODS, SYSTEMS, AND COMPUTER READABLE MEDIA FOR PROVIDING A SECURE VIRTUAL RESEARCH SPACE

PRIORITY CLAIM

This application claims the benefit of U.S. Provisional Patent Application Ser. No. 61/675,780, filed Jul. 25, 2012; the disclosure of which is incorporated herein by reference in its entirety.

TECHNICAL FIELD

The subject matter described herein relates to methods and systems for secure, controlled access sharing of information, such as in a collaborative environment. More particularly, the subject matter described herein relates to providing a secure virtual research space.

BACKGROUND

Research, whether it is academic or industry-based, increasingly requires collaboration between multiple groups where the collaborations are characterized by conducting research on shared data. Collaborative research among groups of researchers or research teams allows each group to take advantage of the discoveries of the other groups, which can accelerate the pace of progress and provide opportunities for synergy between disparate research foci.

Collaborative research has its own challenges, however, including how to best share information among the collaborative partners in a secure and confidential manner. In one example, collaborative biomedical research between multiple institutions involves the sharing of each institution's data, results, and conclusions with the other institutions. Such data can be shared by direct transfer from each institution to each of the other institutions, referred to herein as a "distributed" solution, or data from all institutions can be collected in a common repository that can be accessed by all collaboration partners, referred to herein as a "centralized" solution. Such collaborations are challenging to construct and maintain, as multiple issues must be resolved, including agreement on data usage policies, establishing trust between collaborators that data usage policies will be abided by, and providing the technical means of sharing and integrating data securely and in a time-efficient manner.

In collaborative research in particular, there are often the conflicting requirements to provide ready access to the data by all collaboration partners and at the same time restrict or block access to the data by any party or entity that is not a collaboration partner. Each collaborative entity should have ready access to the data without reducing the security level of the overall collaboration and without increasing the risk of leaking sensitive data to the outside world.

Many technical approaches have been tried to provide electronic-based infrastructure to facilitate such collaborations, but to date adoption has been limited. The are many reasons for failure, including the inability of solutions to adapt to the rapidly changing requirements of researchers, infrastructure cost, infrastructure complexity, and the inability to properly address data security and data privacy concerns. Conventional approaches to this problem include attempting to centralize the infrastructure, relying on non-technical solutions, such as data use agreements, or relying on each group to properly implement protection. Each of these approaches has disadvantages.

Centralizing the infrastructure can be done in two ways. The first way is to copy all data to a shared location with centralized authentication and authorization. This requires duplication of resources and raises the issue of data coherency between the centralized copy and the remote copy. The second way is to have all data exist only in the shared location, e.g., moving the group to the centralized location rather than moving the data to the centralized location.

Non-technical solutions tend to rely on promises to abide by agreed-upon behavior and imposition of some punitive measures for a breach of these agreements. For example, the parties may sign a data use agreement in which each party promises to share data only with the other collaborative partners. Such agreements would cover sharing of data by email to the other parties, for example. These solutions are susceptible both to accidental sharing of confidential information due to human error and to deliberate sharing of confidential information by fraud or intentional breach.

De-centralized technical solutions, in which each group is responsible for properly implementing protection, are only as secure as the security policies and implementations of the least secure group member. Here also, it is surprisingly difficult to implement secure transport of data from one party to another or from each party to a shared repository. Email encryption programs, for example, have been in existence for decades but are still not widely used; the vast majority of email sent is not encrypted in any way.

Another approach is to create a custom solution for secure, authenticated, and authorized data integration systems, but these solutions are by definition ad hoc, are usually so customer-specific as to be essentially non-reusable, and are thus usually very expensive to design and implement.

Thus, what is needed is an infrastructure that provides security, authentication, and authorization yet makes data sharing easy. Such an infrastructure would allow the researchers the flexibility to implement whichever data integration solution they deem best. Accordingly, there exists a need for methods, systems, and computer readable media for providing a secure virtual research space.

SUMMARY

According to one aspect, the subject matter described herein includes a system for providing a secure virtual research space. The system includes: a data grid for storing and managing data to be shared among multiple collaborative partners, the data grid comprising at least one data storage device; at least one virtual network appliance, each virtual network appliance comprising a hardware processor for providing controlled access to shared data on the data grid by a user; and a data leakage protection mechanism for preventing unauthorized transfer of data out of the secure virtual research space.

According to one aspect, the subject matter described herein includes a method for providing a secure virtual research space. The method includes providing a secure virtual research space that includes a data grid for storing and managing data to be shared among a plurality of collaborative partners, the data grid comprising at least one data storage device, and at least one virtual network appliance, each virtual network appliance comprising a hardware processor for providing controlled access to shared data on the data grid by a user. The method also includes providing a data leakage protection mechanism for preventing unauthorized transfer of data out of the secure virtual research space.

The subject matter described herein can be implemented in software in combination with hardware and/or firmware. For example, the subject matter described herein may be implemented in software executed by one or more processors. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media are provided for providing a secure virtual research space. Reference will now be made in detail to exemplary embodiments of the present invention, examples of which are illustrated in the accompanying drawings. Wherever possible, the same reference numbers will be used throughout the drawings to refer to the same or like parts.

In order to provide a distributed computing infrastructure that addresses the concerns that arise when collaborators are from different administrative domains, e.g., universities, departments, labs, companies, or divisions, and have different concerns and policies concerning the sharing and dissemination of data, the subject matter disclosed herein provides a secure research space, or SRS, that makes it possible to: provide assurance of consistent policy implementation for infrastructure security and data privacy; ensure all policies meet evolving collaboration requirements and institutional requirements; leverage existing, paid-for IT resources; provide for easy, policy-based, secured and rapid sharing of data; easily adapt to the addition or removal of collaborating sites; reduce IT time and cost to build, use, and sustain; and allow collaborations that include sites with differing IT infrastructures. Unlike traditional approaches to data sharing, SRS does not attempt to provide capabilities, such as semantic mediation of federated data. Instead, SRS focuses on providing a data sharing fabric that researchers can readily adapt to their own collaborative needs.

The subject matter disclosed herein addresses three specific security concerns: security within the trust fabric, security surrounding the trust fabric, and point-to-point security between entities using the trust fabric. These will be described in more detail with reference to FIG. 1.

Figure 1:
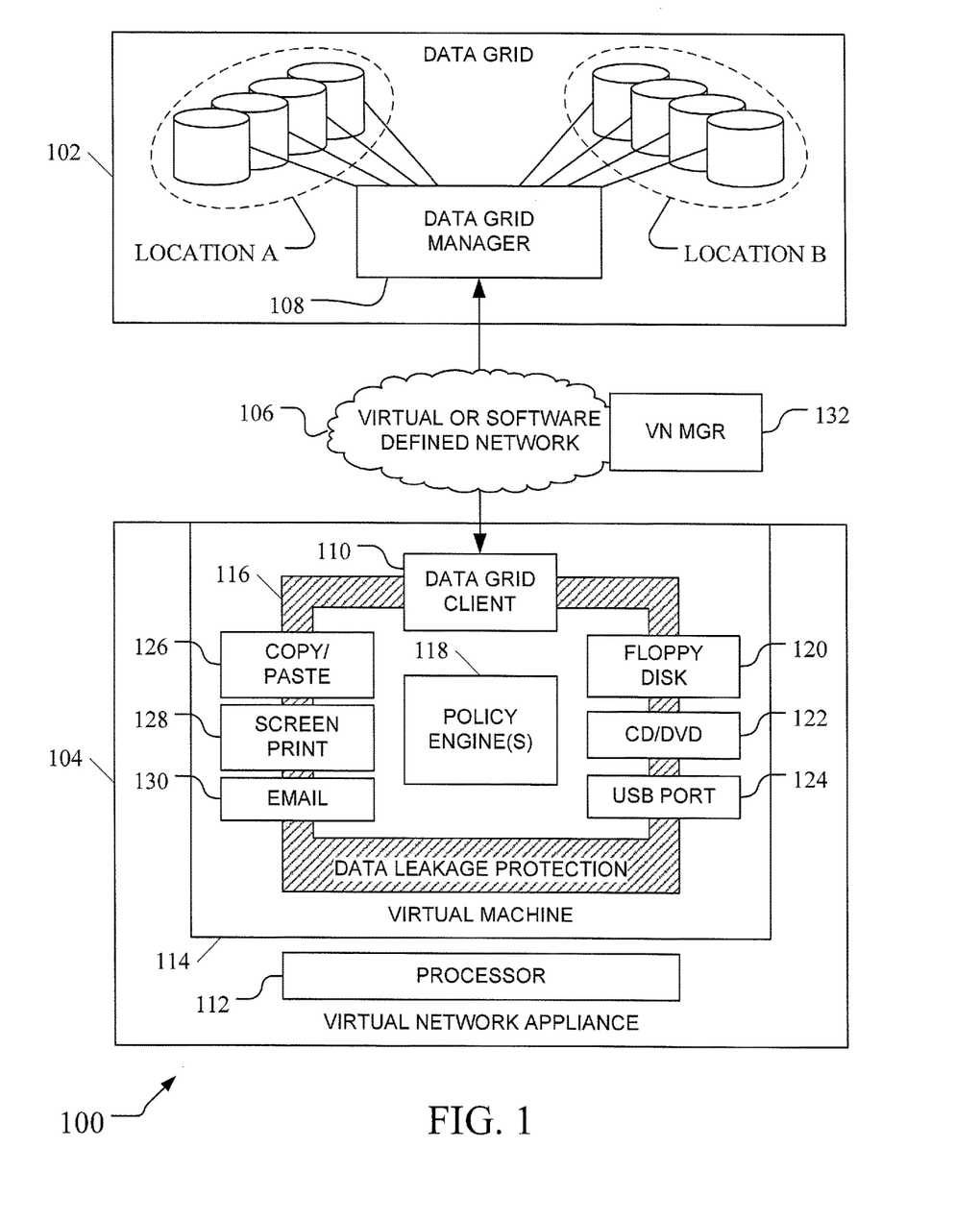
FIG. 1 is a block diagram of an exemplary system for providing a secure virtual research space according to an embodiment of the subject matter described herein.

FIG. 1 is a block diagram of an exemplary system for providing a secure virtual research space (SRS) according to an embodiment of the subject matter described herein.

In the embodiment illustrated in FIG. 1, a system 100 for providing a secure virtual research space includes a shared data repository, called the data grid 102, for storing data to be shared across multiple collaborative partners, which may be individuals, groups or teams of individuals, organizations, etc. Data on data grid 102 may be accessed using one or more virtual network appliances (VNAs) 104 via a secure network 106.

The combination of data grid 102, VNA 104, and secure network 106 uniquely addresses three distinct security concerns: security within the SRS, including secure access to shared data; security surrounding the SRS, including protection against "data leakage", i.e., the unauthorized or accidental transfer of data out of the SRS; and point-to-point security, including security around both local and remote access. How these three concerns are addressed by the systems and methods described herein will be discussed in more detail below.

Data grid 102 provides security within the SRS, including secure access to shared data. Data grid 102 includes file and/or data storage devices for storing data. Exemplary storage devices include, but are not limited to, hard disk drives, solid-state drives, flash drives, or other means of storage. In one embodiment, data grid 102 may be a distributed file system that spans locations and devices. In the embodiment illustrated in FIG. 1, for example, data grid 102 includes a first set of storage devices in one location, A, and a second set of storage devices in another location, B.

In one embodiment, data grid 102 may provide access to many types of data, including files and folders but also non-file data, including publish/subscribe ("pub/sub") data, RSS feeds, data from social networking sites, the results of database queries, and others. In one embodiment, data grid 102 provides a level of abstraction that maps a logical file space to a physical file space, which may be invisible to the user. In one embodiment, data grid 102 may handle some or all of the storage, replication, synchronization, and backup functions for data stored within its data storage devices, wherever those devices happen to be located.

Data grid 102 controls access to the shared data, including performing authentication and authorization functions, to allow access to authorized parties and to deny access to unauthorized parties. In one embodiment, data grid 102 may use meta data associated with files, folders, streams, queries, or other data constructs to determine access privileges. In such embodiments, data grid 102 provides location-agnostic access control: data can be located not only anywhere within the physical file system but also anywhere within the logical file system. Alternatively, data grid 102 may use conventional location-based access control, e.g., access permissions are defined at least in part on where in the logical file system the data resides. For example, data grid 102 may use folder-based access control lists; data grid 102 may generate a file name or folder name that includes an indication of the parties or groups to whom access should be granted, etc.

Data grid 102 provides more than just access control; it can also apply policy rules that can not only define an access condition but also define a "rule action" that defines actions that may/must be taken when certain file access events occur. For example, data grid 102 may keep a single, centralized copy of all data, or it might create duplicate copies of all data, stored at locations that are local to a user or group. In an example scenario, a research group in one country may be collaborating with another group in another country; data grid 102 physical file storage may include some storage in each country, e.g., as a means to provide geographically diverse backups, to reduce data access time at each site, etc.

For example, data grid 102 policies may dictate that any time new data is added to file storage in one country, a copy of that data must be sent to the file storage in the other country. In this example, a "file write rule action" may be triggered whenever new data is written to one location or the other, and that rule action may specify that a copy of that data should be sent to all other sites where a member of the collaborative team is located.

Likewise, rule actions may dictate what should happen when a particular piece of data is deleted from one location: the rule action may specify that when data is deleted from one site, that same data will be deleted from all other sites. Alternatively, the rule action may specify that when data is deleted from one site, the corresponding data should NOT be automatically deleted from all sites but can only be deleted manually. In yet another example, one site may be considered the master site for a particular piece of data, such that copies of a particular piece of data existing on other sites cannot be deleted unless that data has been deleted from the master site. Other types of rules and actions are possible.

In one embodiment, data grid 102 may record or log some or all activity, such as data access or attempted data access or other activity by users or, in the case of rule actions, activity by data grid 102 itself.

In one embodiment, data grid 102 includes a data grid manager 108 for mapping the logical file space to a physical file system. Data grid manager 108 may also perform none, some, or all of the functions (e.g., security, rule-action, and logging) described above. In one embodiment, Data grid manager 108 may tailor what data will be visible and/or accessible to a user based on that user's profile, e.g., which research groups or projects the user is a member of, what that user's permissions are, and so on.

In one embodiment, access to data grid 102 is provided to a user via data grid access software, herein referred to as a data grid client 110. Exemplary data grid clients 110 include, but are not limited to, a graphical user interface (GUI) that presents data as files and folders, a GUI that provides a drag-and-drop interface, a command line interface (CLI), and a plugin for a browser or other application. In one embodiment, data grid client 110 may present data within data grid 102 as a set of files and folders in a GUI. In one embodiment, access to data grid 102 requires an interaction between data grid client 110 and data grid manager 108, which may act as the server in a client/server relationship. In this embodiment, data grid manager 108 and/or data grid client 110 can impose the necessary security restrictions and perform any rule action associated with the data access.

Data that may be stored within data grid 102 includes, but is not limited to, clinical patient data, census data, etc. Different types of data may be treated with different levels of confidentiality. For example, data that identifies a particular individual may be subject to stricter access control and more stringent privacy and security polices than anonymous data, such as statistical data, summary data, or data for which personally identifying information has been removed. Data grid manager 108 has the capability to apply policies that are appropriate to the type of data.

Security surrounding the SRS, including protection against "data leakage", i.e., the unauthorized or accidental transfer of data out of the SRS, and point-to-point security, including security around both local and remote access, is provided by a combination of features found in the virtual network appliances 104 and the secure network 106. VNAs are used by users of SRS 100, e.g., by members of a collaboration. The use of VNAs guarantee that the proper software clients (data grid access, data leakage protection, point-to-point protection) are present, running, and up to date.

In the embodiment illustrated in FIG. 1, system 100 includes a single VNA 104 that communicates with data grid 102 via secure network 106, but multiple VNAs may be supported.

In the embodiment illustrated in FIG. 1, VNA 104 includes one or more hardware processors 112, which execute a virtual machine (VM) 114 running in memory, which could be transitory or non-transitory computer readable media, such as RAM, FLASH, etc. VM 114 may host at least one operating system (OS), which may be preconfigured with all the software, applications, device drivers, plugins, etc., required to implement the SRS. In one embodiment, the preconfigured OS has been preconfigured with security settings or policies that are under control of an administrator that is separate from the user of the VNA, so that a malicious user cannot overcome or defeat the security settings or policies in place.

In the embodiment illustrated in FIG. 1, VM 114 includes a data leakage protection function (DLP) 116, which may be implemented as an application, a plugin, a kernel extension, or other software or firmware construct. DLP 116 may be a component within or function of VM 114. DLP 116 may be part of a hypervisor, i.e., software that manages virtual machines. The function of DLP 116 is to protect against data being transferred out of SRS 100, herein referred to as "data export". Thus, DLP 116 controls what data is allowed to be removed from VNA 104. DLP 116 provides for enforcement of data policies related to data being removed from a collaboration. In one embodiment, DLP 116 may operate within a software defined network, or SDN.

In one embodiment, DLP 116 includes a policy engine 118 that defines when data may or may not be transferred out of SRS 100. For example, policy engine 118 may include a set of rules that allow or deny data export based on the user's permissions, the contents of the data, the group or groups that the data is associated with, the level of confidentiality or secrecy associated with the data, or other attributes. In one embodiment, policy engine 118 may receive updated policy rules from a policy server.

DLP 116 can exert control over various elements of VNA 104. In the embodiment illustrated in FIG. 1, for example, DLP 116 operates to control whether or not data can be written to a floppy drive 120, a writeable CD/DVD 122, or a device attached to a USB port 124, such as a portable flash drive, for example. In this scenario, DLP 116 may enforce a rule such as "allow copy to anything except removable media".

DLP 116 can exert control over various operations associated with the operating system and/or applications as well. For example, DLP 116 can block a copy and/or paste operation 126 if it determines that the contents of the copy buffer contain sensitive material, if the user attempting the copy/paste is not authorized to export the data, based on the source or destination of the transfer, and so on. Likewise, DLP 116 may block a screen print operation 128. DLP 116 may block transmission of data via email 130, such as blocking email to untrusted recipients or email that contains sensitive data. DLP 116 may exert control over every aspect of data export, including operation of data grid client 110.

In one embodiment, DLP 116 may log every transfer or attempted transfer. DLP 116 may issue notifications or reports of activity, including warnings of prohibited activity.

In one embodiment, each VNA 104 is running on a host computer, which may be a personal computer, a processor on a server in a rack of servers provided by a hosting company, or other hardware suitable for hosting the VM. The host computer may be physically located close to the user or may be located elsewhere, in the cloud, etc. Because the VM must be running the proper software, VNA hardware and software are typically controlled administratively by the operator of system 100 rather than by users of system 100. In one embodiment, the user accesses a VNA 104 via a remote desktop connection program. Typically, that user does not have administrative privileges on the VNA 104, so that the user cannot bypass the security mechanisms in place. The use of a remote desktop program to access a VNA has the additional advantage that VNAs may be allocated dynamically as needed. As a measure of additional security, a research team may dictate that the VM running on the VNA will be completely deleted every time a user logs out. This forces the user to make sure that all data has been properly stored within data grid 102 and also removes the VM data so that it can't be analyzed for the purpose of gleaning confidential information.

In one embodiment, a VM may be configured according to the particular needs of a site, project, team, etc., and stored as an image file that contains the OS, applications, drivers, plugins, and other software needed by the user. A library of image files may be maintained by the operator of SRS 100. In this manner, when a new user joins a collaboration, a new VNA may be provisioned by simply installing a VM from the appropriate image file. Image files so created may be customized in other ways, as well, such as by including different suites of software particularly suited to the end user's needs. The software needed by a researcher in the lab may be different from the software needed by a team administrator, for example, in which case there may be an image file for researchers and another for administrators.

Point-to-point security is provided in part by secure network 160. In one embodiment, secure network 160 may be a virtual network (VN) or software defined network (SDN), which allows creation of a private layer 2 network infrastructure between several collaborating sites.

In one embodiment, secure network 106 includes a common management server to manage the trust fabric. In the embodiment illustrated in FIG. 1, SRS 100 includes a virtual network manager (VNM) 132 for this purpose. In one embodiment, VNM 132 handles the deployment and takedown of VNAs. This deployment and takedown may be performed automatically or manually. Automatic deployment provides system 100 with a mechanism for dynamically provisioning a secure data sharing fabric. In one embodiment, VNM 132 may create a virtual private network (VPN) on demand between sites or individual nodes, including between VNAs. To support VPN, VNA 104 (or VM 114) may include VPN software, device drivers, or other software needed to support virtual networking, as needed.

In one embodiment, VNM 132 creates and maintains software-defined networks, or SDNs, which establishes layer two (L2) connections between devices, without any layer 3 (L3) negotiation: instead, VNM 132 modifies the routing tables used by routers and other nodes within secure network 106. This capability provides SRS 100 with a mechanism for dynamically provisioning a secure data sharing fabric. For example, a first set of VNA nodes may form a first virtual network, and a second set of VNA nodes may form a second virtual network, where nodes in one virtual network do not see/cannot route to nodes in the other virtual network. Overlapping virtual networks are also possible.

Figure 2:
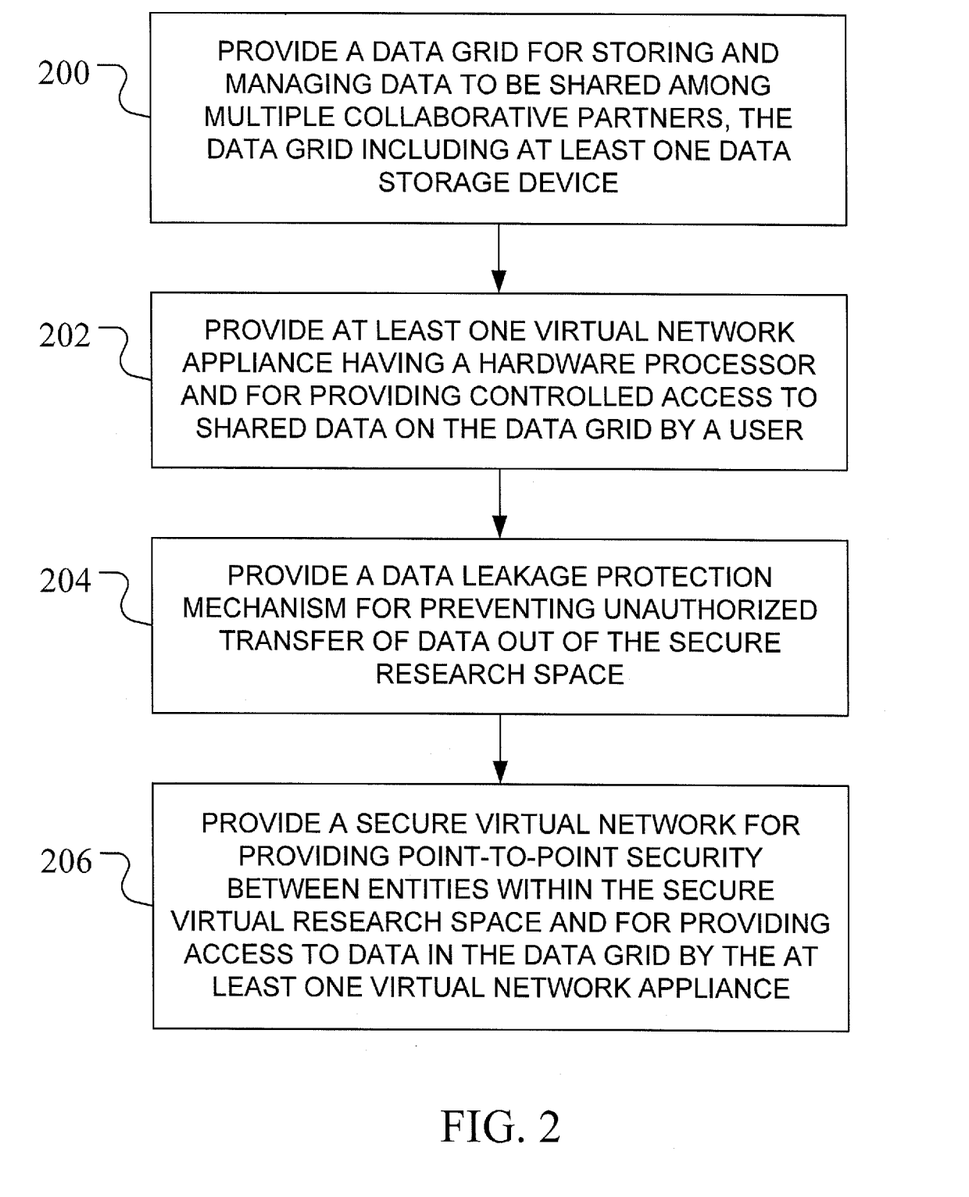
FIG. 2 is a flow chart illustrating an exemplary process for providing a secure virtual research space according to an embodiment of the subject matter described herein.

FIG. 2 is a flow chart illustrating an exemplary process for providing a secure virtual research space according to an embodiment of the subject matter described herein.

At step 200, a data grid for storing and managing data to be shared among a plurality of collaborative partners, the data grid comprising at least one data storage device, is provided. In the embodiment illustrated in FIG. 1, for example, system 100 includes data grid 102.

At step 202, at least one virtual network appliance, each virtual network appliance comprising a hardware processor for providing controlled access to shared data on the data grid by a user, is provided. In the embodiment illustrated in FIG. 1, for example, VNA 104 provides a user with access to data in data grid 102.

At step 204, a data leakage protection mechanism for preventing unauthorized transfer of data out of the secure virtual research space is provided. In the embodiment illustrated in FIG. 1, for example, DLP 116 may be configured to control access to data grid 102. In one embodiment, DLP 116 may access policy engine 118 and control data grid client 110 and its interaction with data grid manager 108 based on policy rules maintained by policy engine 118.

At step 206, a secure network for providing point-to-point security between entities within the secure virtual research space and for providing access to data in the data grid by the at least one virtual network appliance is provided. In the embodiment illustrated in FIG. 1, for example, VNA 104 can access data grid 102 via network 106. In one embodiment, network 106 may be a virtual private network or a software-defined network.

Figure 3:
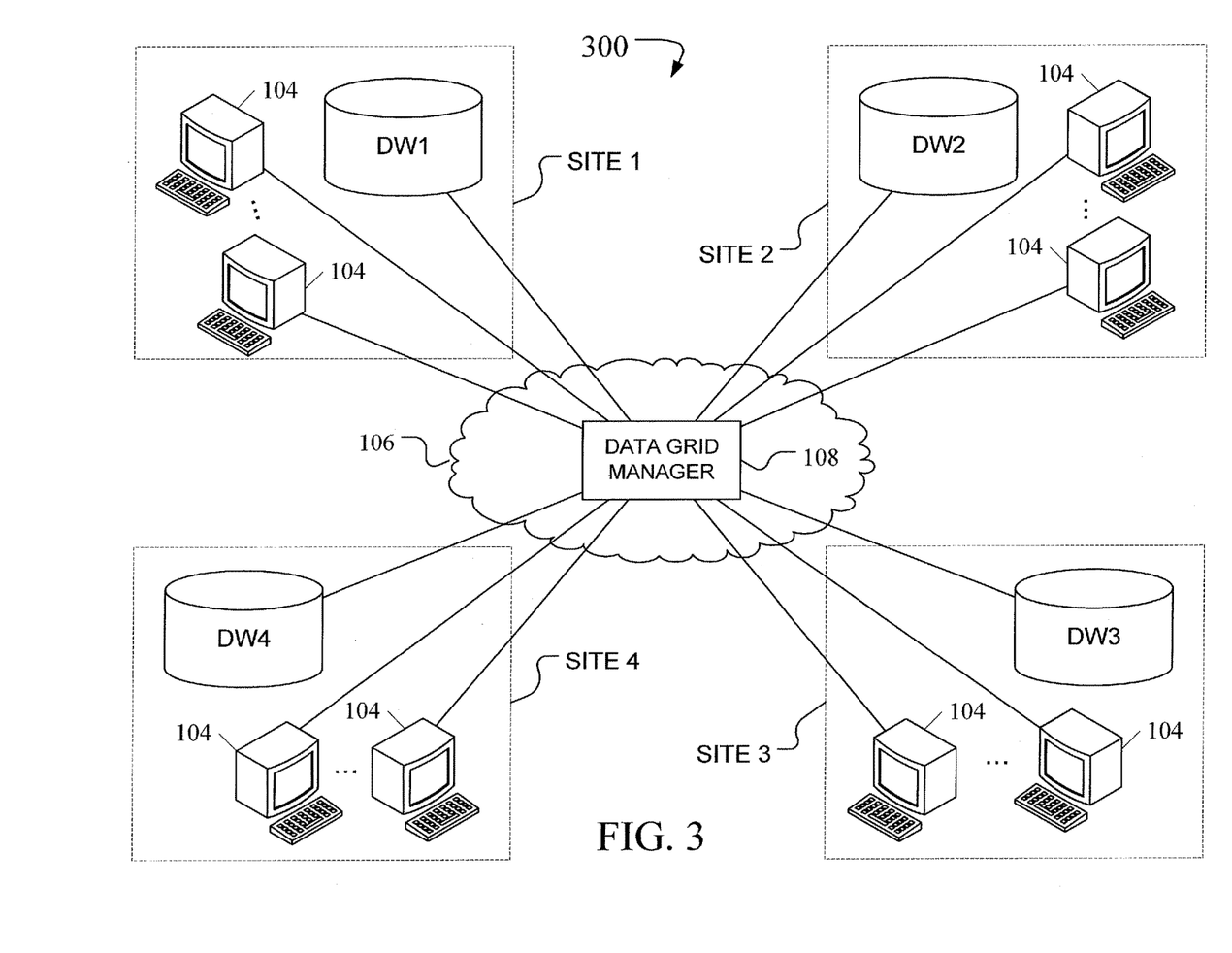
FIG. 3 is a block diagram of an exemplary system for providing a secure virtual research space according to another embodiment of the subject matter described herein.

FIG. 3 is a block diagram of an exemplary system for providing a secure virtual research space (SRS) according to another embodiment of the subject matter described herein. In the embodiment illustrated in FIG. 3, SRS 300 is used to share data with multiple users located across four geographic locations, listed as SITE 1 through SITE 4. Each site contains a local data warehouse DW for storing data. In the embodiment illustrated in FIG. 3, the four data warehouses collectively form a data grid that is geographically distributed and controlled by data grid manager 108 and communicate via secure network 106. Multiple VNAs 104 are available at each site, although only two VNAs are shown for each site in FIG. 3. The functions of VNA 104, secure network 106, and data grid manager 108 are essentially identical to their like-numbered parts in FIG. 1, and therefore their descriptions will not be repeated here.

FIG. 3 illustrates an embodiment in which data grid 102 is geographically distributed and where each VNA 104 does not access its local data warehouse directly but instead accesses data via the data grid manager 108.

Figure 4:
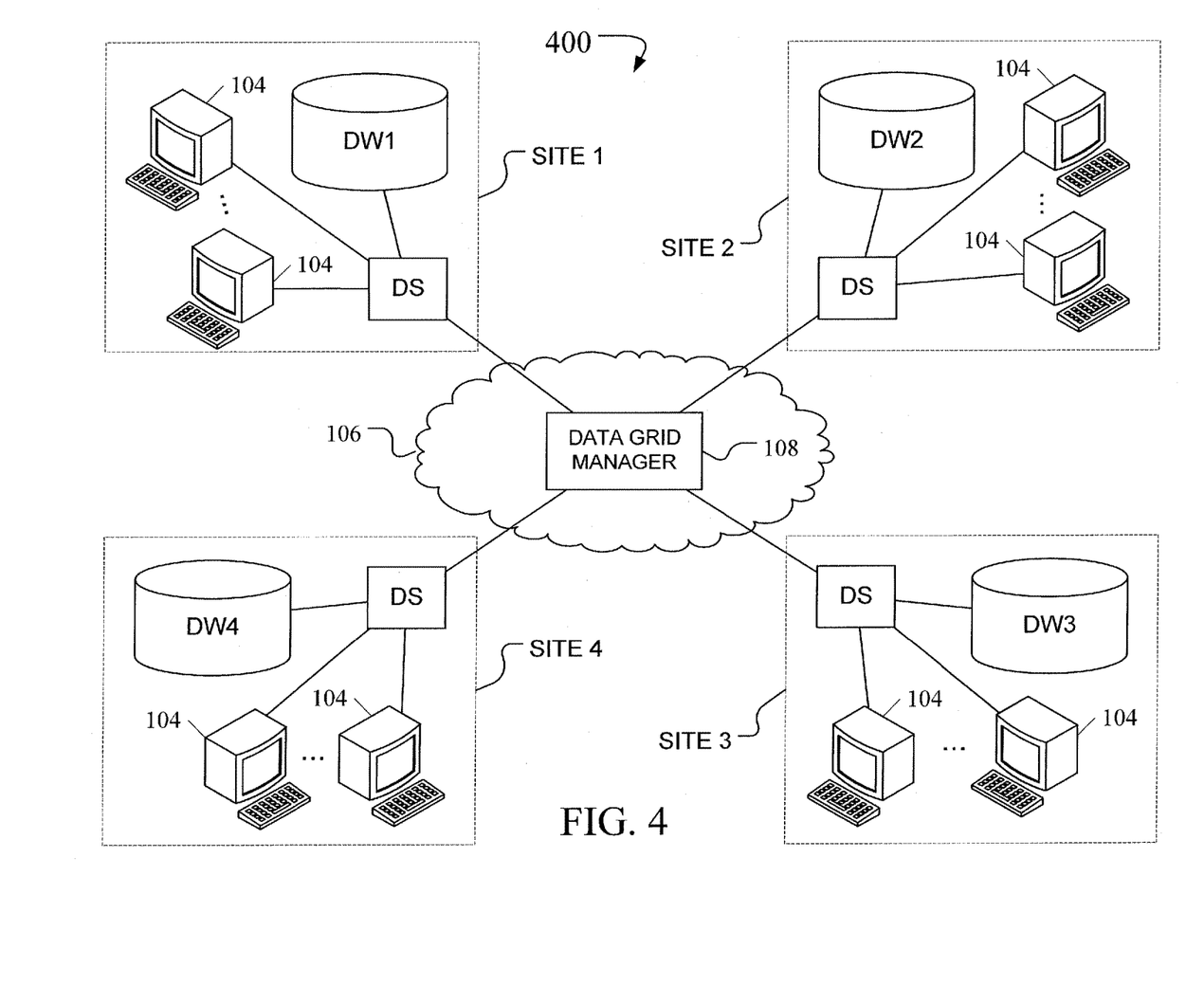
FIG. 4 is a block diagram of an exemplary system for providing a secure virtual research space according to yet another embodiment of the subject matter described herein.

FIG. 4 is a block diagram of an exemplary system for providing a secure virtual research space (SRS) according to yet another embodiment of the subject matter described herein. The embodiment illustrated in FIG. 4 is nearly identical to the system shown in FIG. 3, except that each site may include its own local data server DS, which allows VNAs 104 to access data in the local data warehouse DW if the data being sought happens to be located there. In one embodiment, each DS is under the control of data grid manager 108.

Figure 5:
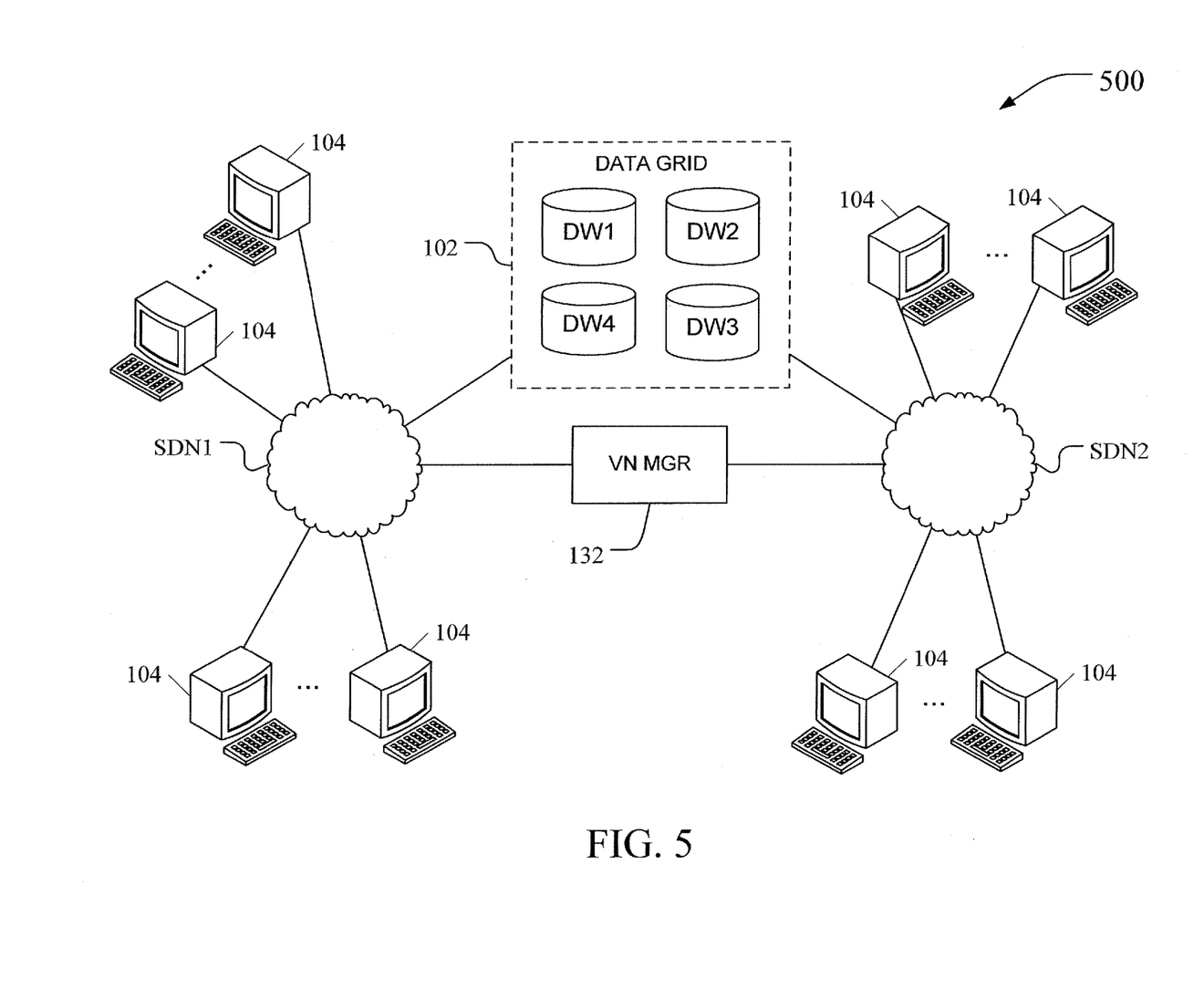
FIG. 5 is a block diagram of an exemplary system for providing a secure virtual research space according to yet another embodiment of the subject matter described herein.

FIG. 5 is a block diagram of an exemplary system for providing a secure virtual research space (SRS) according to yet another embodiment of the subject matter described herein. The embodiment illustrated in FIG. 5 is nearly identical to the system shown in FIG. 3, except that virtual network manager 132 has created two software-defined networks, SDN1 and SDN2. In the embodiment illustrated in FIG. 3, VNAs from sites 1 and 4 are part of SDN1 while VNAs from sites 2 and 3 are part of SDN2. In this example, data warehouses DW1-DW4 are still collectively part of one data grid 102, but the data that is visible to VNAs in SDN1 may be different from the data that is visible to VNAs in SDN2.

Figure 6:
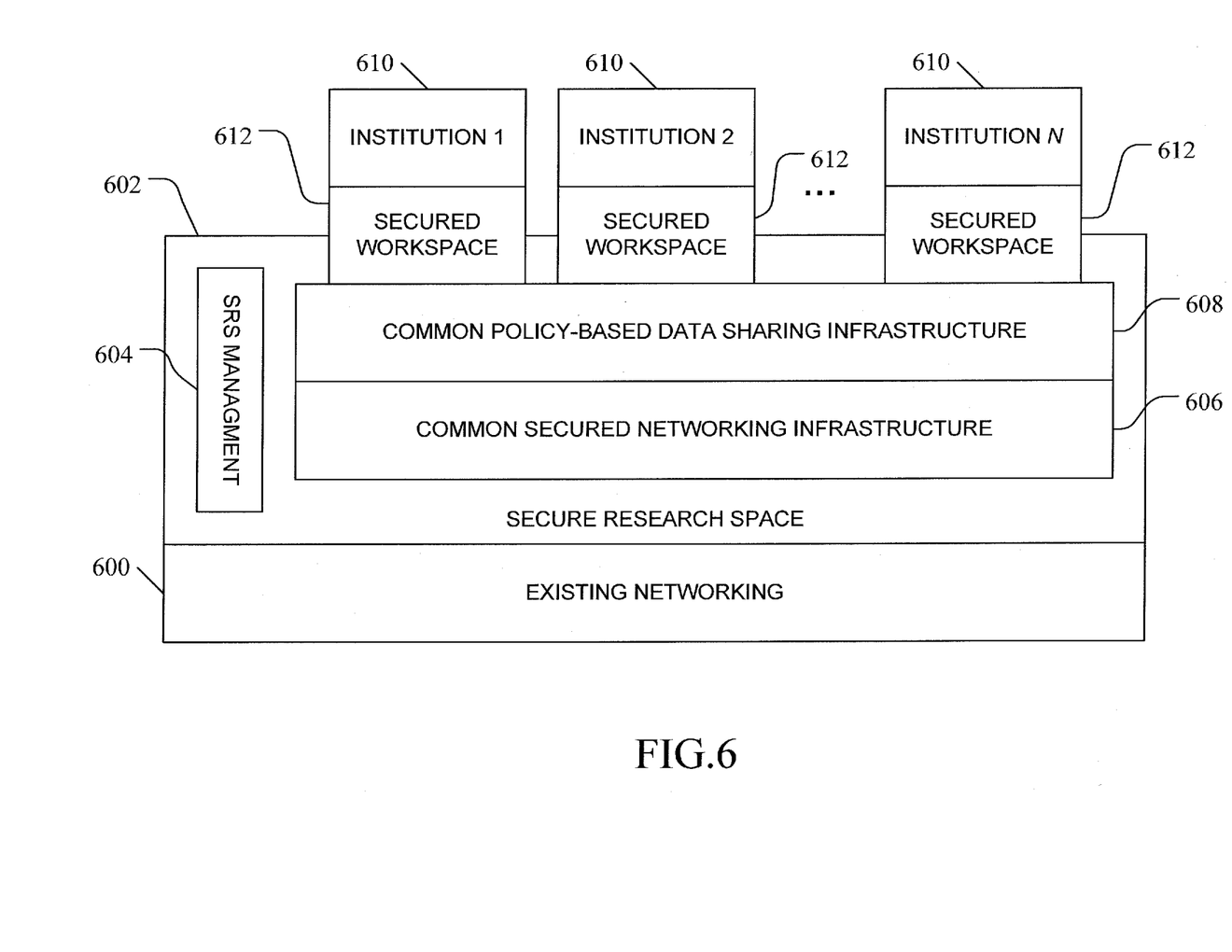
FIG. 6 is a block diagram illustrating SRS high-level architecture according to an embodiment of the subject matter described herein.

FIG. 6 is a block diagram illustrating SRS high-level architecture according to an embodiment of the subject matter described herein. In the embodiment illustrated in FIG. 6, existing networking infrastructure and protocols 600 form the base upon which SRS 602 is built. SRS 602 includes an SRS management function or entity 604 and a common, secured, and, in some embodiments, dedicated networking infrastructure 606, which serves as a foundation for a common, policy-based data-sharing infrastructure 608. Institutions 610 use SRS 602 to provide secured workspaces 612.

In summary, the challenges of providing a secure research space broadly fall into two categories. First, the contributing members of a collaboration have different expectations around data sharing that are typically addressed through the definition of policies around data usage. Such policies define expectations such as: what data can be shared and with whom; who can delete and edit data; what protections are provided to eliminate the risk that data is improperly shared; and what are the consequences of violations in policies. The infrastructure must be capable of enforcing those policies with adequate visibility and auditing to allow collaborators and regulatory agencies to have trust that policies are being enforced. Second, the infrastructure must provide the technical means to allow researchers to readily share data in ways that promote the goals of the collaboration. Such infrastructure most accommodate for a variety of challenges, such as: different IT technologies in use by each collaborating entity; different tools used by researchers; different operating systems across the collaboration; and different networking setups. To be most effective, the infrastructure should minimize the cost and time overhead of establishing, maintaining, and ending a data sharing collaboration while still enforcing policies.

The systems and methods of the subject matter described herein address these challenges by providing a base set of capabilities that provide both security around the collaboration and within the collaboration while enabling simple, but managed peer-to-peer sharing of data. This idea is in contrast to traditional approaches that either attempt to centralize the sharing of data in order to manage security and efficiency concerns or attempt to use data federation technologies to integrate data between collaborating sites. The benefit of the SRS approach is that the focus of the approach is on the core problems that arise in data sharing collaborations, namely efficient, but managed sharing of distributed data. An SRS can be deployed for particular research collaboration or deployed as a general-purpose infrastructure that can be offered up for research collaborations. The infrastructure can be run independent of information technology (IT) infrastructure at collaborating sites, or deployed within the IT infrastructure at collaborating sites, thus allowing collaborators freedom in leveraging their own IT resources. The technological approach of the SRS allows for secured data sharing to be established for pre-specified periods of time. As such, SRS is effectively a cloud technology that is geared at providing a data-sharing infrastructure.

It will be understood that various details of the subject matter described herein may be changed without departing from the scope of the subject matter described herein. Furthermore, the foregoing description is for the purpose of illustration only, and not for the purpose of limitation.

What is claimed is:

1. A system for providing a secure virtual research space, the system comprising:
   a data grid for storing and managing data to be shared among a plurality of collaborative partners, wherein at least some of the collaborative partners are associated with different institutions having different policies concerning use and sharing of the data, the data grid comprising at least one data storage device;
   a data grid manager for mapping a logical file space to a physical file space of the data grid and tailoring what data in the data grid will be accessible based on an institution with which a user is associated and permissions of the user specified by a policy of the institution concerning use and sharing of data, wherein the data grid manager implements a policy rule including a file write rule action that is triggered when new data is written to a file at one site and that causes a copy of that data to be sent to all other sites where members of a collaborative team associated with the policy rule are located;
   a plurality of virtual network appliances, each virtual network appliance comprising a hardware processor for providing controlled access, via the data grid manager, to shared data on the data grid;
   a virtual network manager for creating and maintaining secure virtual networks connecting the virtual network appliances, wherein the virtual network manager creates and maintains software defined networks (SDNs) between the virtual network appliances by establishing layer 2 connections between the virtual network appliances without layer 3 negotiation and instead by modifying route tables used by routers and other nodes within a secure virtual network; and
   a data leakage protection mechanism for preventing unauthorized transfer of data out of the secure virtual research space.

2. The system of claim 1 wherein storing and managing data includes isolating a logical namespace utilized by the at least one virtual network appliance from physical file locations within the at least one data storage device.

3. The system of claim 1 wherein storing and managing data includes performing at least one of: data storage, data replication, data synchronization, and data backup.

4. The system of claim 1 wherein the data grid stores clinical patient data or patient census data.

5. The system of claim 1 wherein the data grid comprises a plurality of data storage devices.

6. The system of claim 5 wherein at least one of the plurality of data storage devices is geographically diverse from another of the plurality of data storage devices.

7. The system of claim 1 wherein controlling access to data comprises allowing or denying access to shared data based on at least one of: an attribute of a file; an attribute of a VNA; and an attribute of a user of a VNA.

8. The system of claim 1 wherein controlling access within the data grid includes performing an action in response to a data access event.

9. The system of claim 8 wherein a data access event comprises at least one of: a write or attempted write; a read or attempted read; a copy or attempted copy; and a delete or attempted delete.

10. The system of claim 1 wherein the at least one virtual network appliance hosts software, wherein the software includes at least one of:
    data access software for providing the controlled access to the shared data on the data grid; and
    data leakage protection software for providing the data leakage protection mechanism.

11. The system of claim 10 wherein each of the virtual network appliances comprises a virtual machine that hosts at least some of the software.

12. The system of claim 1 wherein each of the virtual network appliances comprises components for at least one of: providing data security; sharing; and analysis.

13. The system of claim 1 wherein the virtual networks provide point-to-point security between entities within the secure virtual research space and provide access to data in the data grid by the virtual network appliances.

14. The system of claim 13 wherein the virtual networks isolate at least some of the virtual network appliances from each other.

15. The system of claim 1 wherein the software defined networks each comprise a private layer-2 network infrastructure that connects at least of the virtual network appliances.

16. A method for providing a secure virtual research space, the method comprising:
    providing a secure virtual research space, the secure virtual research space comprising:
        a data grid for storing and managing data to be shared among a plurality of collaborative partners, wherein at least some of the collaborative partners are associated with different institutions having different policies concerning use and sharing of the data, the data grid comprising at least one data storage device;
        a data grid manager for mapping a logical file space to a physical file space of the data grid and tailoring what data in the data grid will be accessible based on an institution with which a user is associated and permissions of the user specified by a policy of the institution concerning use and sharing of data, wherein the data grid manager implements a policy rule including a file write rule action that is triggered when new data is written to a file at one site and that causes a copy of that data to be sent to all other sites where members of a collaborative team associated with the policy rule are located;
        a plurality of virtual network appliances, each virtual network appliance comprising a hardware processor for providing controlled access to shared data on the data grid;
        a virtual network manager for creating and maintaining secure virtual networks connecting the virtual network appliances, wherein the virtual network manager creates and maintains software defined networks (SDNs) between the virtual network appliances by establishing layer 2 connections between the virtual network appliances without layer 3 negotiation and instead by modifying route tables used by routers and other nodes within a secure virtual network; and
        providing a data leakage protection mechanism for preventing unauthorized transfer of data out of the secure virtual research space.

17. The method of claim 16 wherein storing and managing data includes isolating a logical namespace utilized by the virtual network appliances from physical file locations within the at least one data storage device.

18. The method of claim 16 wherein storing and managing data includes performing at least one of: data storage, data replication, data synchronization, and data backup.

19. The method of claim 16 wherein the data grid stores clinical patient data or patient census data.

20. The method of claim 16 wherein providing the data grid comprises providing a plurality of data storage devices.

21. The method of claim 20 wherein at least one of the plurality of data storage devices is geographically diverse from another of the plurality of data storage devices.

22. The method of claim 16 wherein controlling access to data comprises allowing or denying access to shared data based on at least one of: an attribute of a file; an attribute of a VNA; and an attribute of a user of a VNA.

23. The method of claim 16 wherein controlling access within the data grid includes performing an action in response to a data access event.

24. The method of claim 23 wherein performing an action in response to a data access event comprises performing an action in response to at least one of: a write or attempted write; a read or attempted read; a copy or attempted copy; and a delete or attempted delete.

25. The method of claim 16 wherein each of the virtual network appliances hosts software, wherein the software includes at least one of:
    data access software for providing the controlled access to the shared data on the data grid; and
    data leakage protection software for providing the data leakage protection mechanism.

26. The method of claim 25 wherein each of the virtual network appliances comprises a virtual machine that hosts at least some of the software.

27. The method of claim 16 wherein each of the virtual network appliances comprises components for at least one of: providing data security; sharing; and analysis.

28. The method of claim 16 the virtual networks provide point-to-point security between entities within the secure virtual research space and provide access to data in the data grid by the virtual network appliances.

29. The method of claim 28 wherein the virtual networks isolate at least some of the virtual network appliances from each other.

30. The method of claim 16 wherein the software defined networks each comprise a private layer-2 network infrastructure that connects at least of the virtual network appliances.

31. A non-transitory computer readable medium comprising computer executable instructions that when executed by a processor of a computer control the computer to perform steps comprising:
    providing a secure virtual research space, the secure virtual research space comprising:

a data grid for storing and managing data to be shared among a plurality of collaborative partners, wherein at least some of the collaborative partners are associated with different institutions having different policies concerning use and sharing of the data, the data grid comprising at least one data storage device;

a data grid manager for mapping a logical file space to a physical file space of the data grid and tailoring what data in the data grid will be accessible based on an institution with which a user is associated and permissions of the user specified by a policy of the institution concerning use and sharing of data, wherein the data grid manager implements a policy rule including a file write rule action that is triggered when new data is written to a file at one site and that causes a copy of that data to be sent to all other sites where members of a collaborative team associated with the policy rule are located;

a plurality of virtual network appliances, each virtual network appliance comprising a hardware processor for providing controlled access to shared data on the data grid by a user;

a virtual network manager for creating and maintaining secure virtual networks connecting the virtual network appliances, wherein the virtual network manager creates and maintains software defined networks (SDNs) between the virtual network appliances by establishing layer 2 connections between the virtual network appliances without layer 3 negotiation and instead by modifying route tables used by routers and other nodes within a secure virtual network; and providing a data leakage protection mechanism for preventing unauthorized transfer of data out of the secure virtual research space.

* * * * *